(12) United States Patent
Lee et al.

(10) Patent No.: US 10,863,496 B2
(45) Date of Patent: Dec. 8, 2020

(54) METHOD AND USER EQUIPMENT FOR RECEIVING DOWNLINK SIGNALS

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/463,561

(22) PCT Filed: Dec. 6, 2017

(86) PCT No.: PCT/KR2017/014208
§ 371 (c)(1),
(2) Date: May 23, 2019

(87) PCT Pub. No.: WO2018/106004
PCT Pub. Date: Jun. 14, 2018

(65) Prior Publication Data
US 2019/0380112 A1 Dec. 12, 2019

Related U.S. Application Data

(60) Provisional application No. 62/432,669, filed on Dec. 11, 2016, provisional application No. 62/430,389, filed on Dec. 6, 2016.

(51) Int. Cl.
*H04W 72/04* (2009.01)
*H04L 1/18* (2006.01)

(52) U.S. Cl.
CPC ......... *H04W 72/042* (2013.01); *H04L 1/1887* (2013.01)

(58) Field of Classification Search
CPC ...... H04W 72/042; H04L 1/1887; H04L 1/16; H04L 1/18
See application file for complete search history.

(56) References Cited

U.S. PATENT DOCUMENTS

| | | | | |
|---|---|---|---|---|
| 2009/0259910 | A1* | 10/2009 | Lee | H04W 74/0833 714/748 |
| 2014/0177570 | A1* | 6/2014 | Yi | H04W 28/0278 370/329 |
| 2014/0269397 | A1* | 9/2014 | Pelletier | H04W 52/0216 370/252 |
| 2014/0362832 | A1* | 12/2014 | Rudolf | H04L 1/1822 370/336 |
| 2015/0289246 | A1* | 10/2015 | Suzuki | H04W 76/28 370/329 |

(Continued)

OTHER PUBLICATIONS

HTC, "On starting a UL HARQ RTT Timer", Change Request, 3GPP TSG-RAN WG2 Meeting #95, Aug. 22-26, 2016, R2-165136.

(Continued)

*Primary Examiner* — Ayaz R Sheikh
*Assistant Examiner* — Faiyazkhan Ghafoerkhan
(74) *Attorney, Agent, or Firm* — Dentons US LLP

(57) ABSTRACT

A user equipment (UE) receives a physical downlink control channel (PDCCH) scheduling a data transmission, and starts a hybrid automatic repeat request (HARQ) round trip timer (RTT) timer for the data transmission. The HARQ RTT timer is set to a non-negative value associated with a radio network temporary identifier (RNTI) addressing the PDCCH.

4 Claims, 12 Drawing Sheets

(a)

(b)

(56) References Cited

U.S. PATENT DOCUMENTS

| | | | |
|---|---|---|---|
| 2016/0080131 A1* | 3/2016 | Terry | H04L 1/1854 |
| | | | 370/311 |
| 2016/0081110 A1* | 3/2016 | Suzuki | H04L 5/0094 |
| | | | 370/336 |
| 2017/0223670 A1* | 8/2017 | Chen | H04L 5/0048 |
| 2018/0110084 A1* | 4/2018 | Dinan | H04W 76/28 |
| 2018/0375623 A1* | 12/2018 | Suzuki | H04L 1/1812 |
| 2019/0081743 A1* | 3/2019 | Loehr | H04L 1/1887 |
| 2019/0223162 A1* | 7/2019 | Suzuki | H04W 72/042 |
| 2019/0274077 A1* | 9/2019 | Suzuki | H04W 74/08 |
| 2020/0008262 A1* | 1/2020 | Dinan | H04W 48/12 |

OTHER PUBLICATIONS

Qualcomm Incorporated, "MAC Impacts of Shortened TTI and Processing Time", 3GPP TSG-RAN2 Meeting #96, Nov. 14-18, 2016, R2-168811.

"LTE; Evolved Universal Terrestrial Radio Access (E-UTRA); Medium Access Control (MAC) protocol specification (3GPP TS 36.321 version 13.3.0 Release 13)", ETSI TS 136 321 V13.3.0, Oct. 14, 2016.

"LTE; Evolved Universal Terrestrial Radio Access (E-UTRA); Physical layer procedures (3GPP TS 36.213 version 13.3.0 Release 13)", ETSI TS 136 213 V13.3.0, Nov. 9, 2016.

International Search Report from PCT/KR2017/014208, dated Mar. 7, 2018.

Written Opinion of the ISA from PCT/KR2017/014208, dated Mar. 7, 2018.

\* cited by examiner (a) Control-Plane Protocol Stack (b) User-Plane Protocol Stack (a)

(b)

(a)

(b)

(a)

(b)

METHOD AND USER EQUIPMENT FOR RECEIVING DOWNLINK SIGNALS

This application is a National Stage Entry of International Application No. PCT/KR2017/014208 filed Dec. 6, 2017, which claims priority to U.S. Provisional Application Nos. 62/430,389 filed Dec. 6, 2016 and 62/432,669 filed Dec. 11, 2016, all of which are incorporated herein by reference.

TECHNICAL FIELD

The present invention relates to a wireless communication system, and more particularly, to a method and apparatus for receiving downlink signals.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of receiving, by a user equipment (UE), downlink signals. The method comprises: receiving, by the UE, a physical downlink control channel (PDCCH) scheduling a data transmission; and starting a hybrid automatic repeat request (HARQ) round trip timer (RTT) timer for the data transmission. The HARQ RTT timer is set to a non-negative value associated with a radio network temporary identifier (RNTI) addressing the PDCCH.

In another aspect of the present invention, provided herein is a user equipment for receiving downlink signals. The UE comprises: a radio frequency (RF) unit, and a processor configured to control the RF unit. The processor may be configured to: control the RF unit to receive a physical downlink control channel (PDCCH) scheduling a data transmission; and start a hybrid automatic repeat request (HARQ)

round trip timer (RTT) timer for the data transmission. The HARQ RTT timer may be set to a non-negative value associated with a radio network temporary identifier (RNTI) addressing the PDCCH.

In each aspect of the present invention, the UE may start a retransmission timer when the HARQ RTT timer expires. The UE may monitor a PDCCH for retransmission of the data transmission while the retransmission timer is running.

In each aspect of the present invention, the non-negative value may be a first value if the RNTI is system information RNTI (SI-RNTI), paging RNTI (P-RNTI) or random access RNTI (RA-RNTI). The non-negative value may be a second value if the RNTI is other than the SI-RNTI, the P-RNTI or the RA-RNTI.

In each aspect of the present invention, the non-negative value may be a first value if receiving the PDCCH in a common search space. The non-negative value may be a second value if receiving the PDCCH in UE-specific search space.

In each aspect of the present invention, the first value may be larger than the second value.

In each aspect of the present invention, the first value may be associated with a normal processing time, and the second value may be associated with a short processing time.

In each aspect of the present invention, the RNTI other than the SI-RNTI, the P-RNTI or the RA-RNTI may be a cell RNTI (C-RNTI).

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduce.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
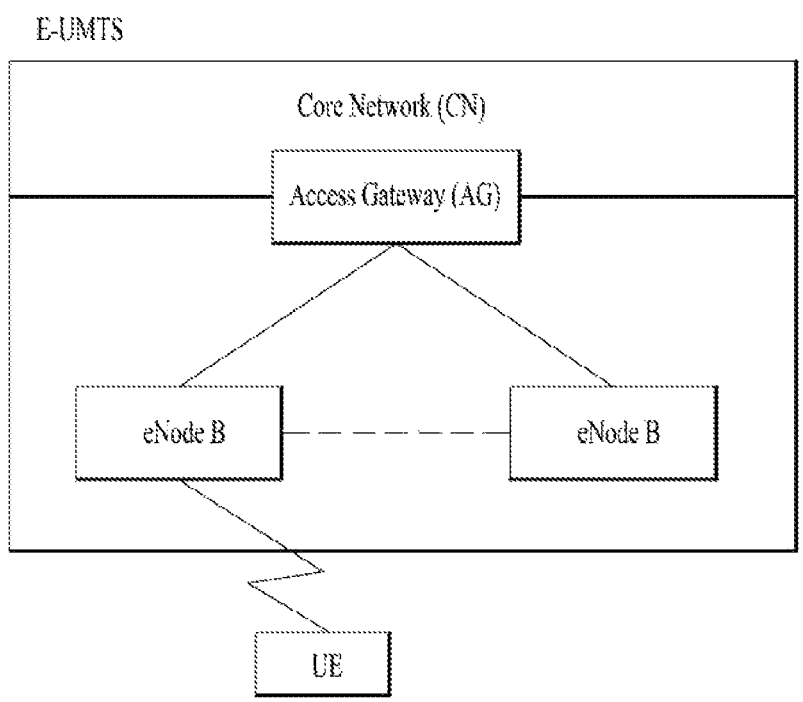
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a hand-held device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB. For convenience of description, in describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
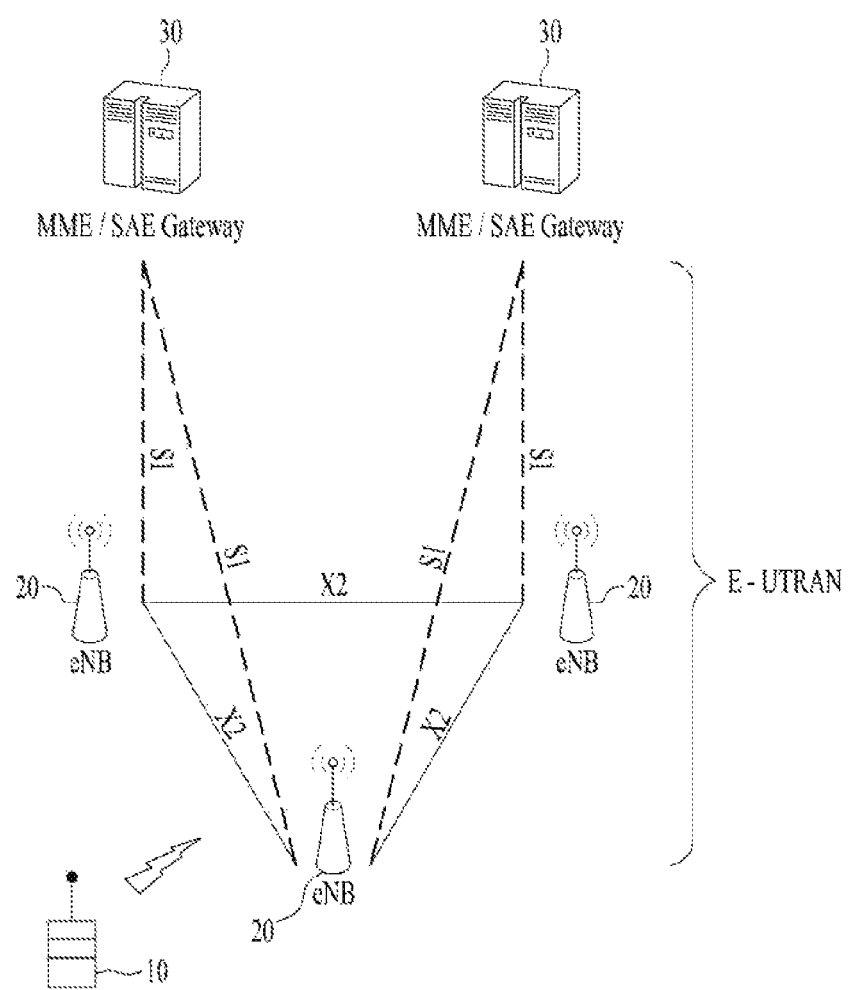
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
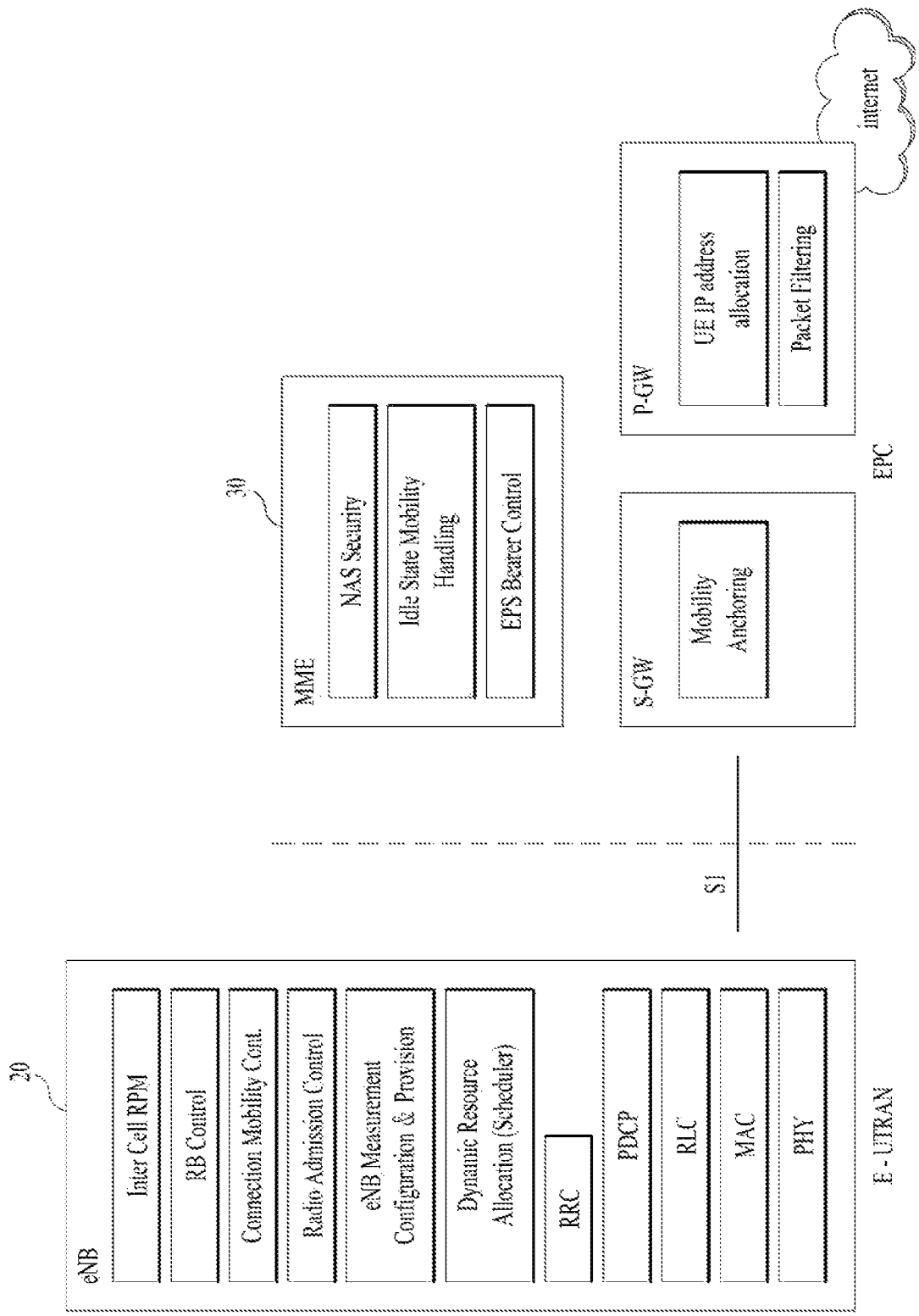
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
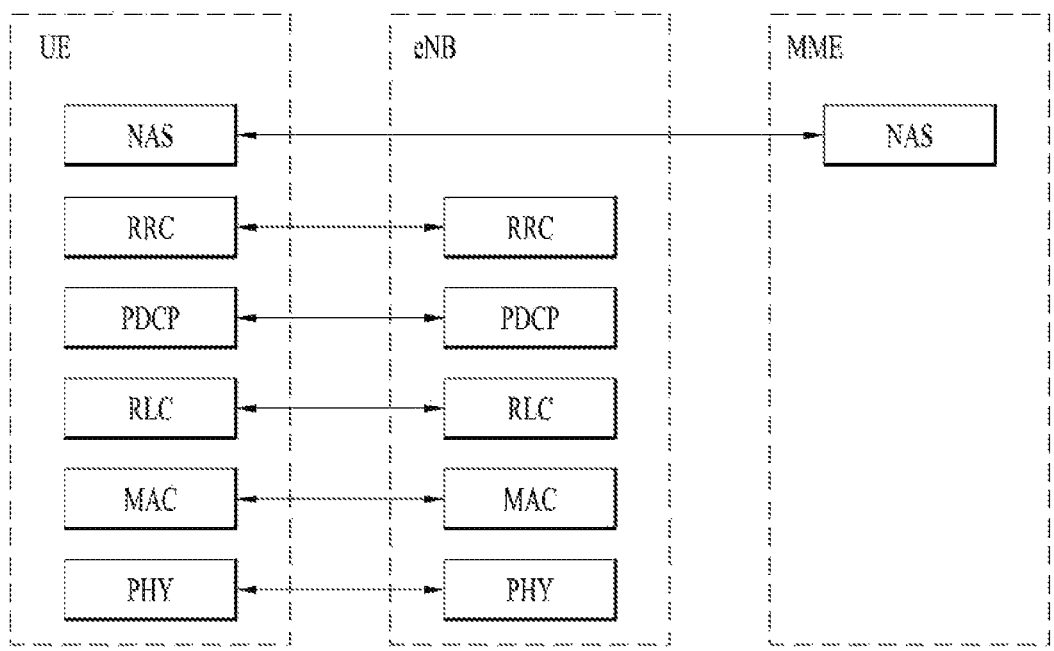
FIG. 4 is a diagram showing a control plane and a user plane of a radio interface protocol between a UE and an E-UTRAN based on a 3GPP radio access network standard.
Figure 4:
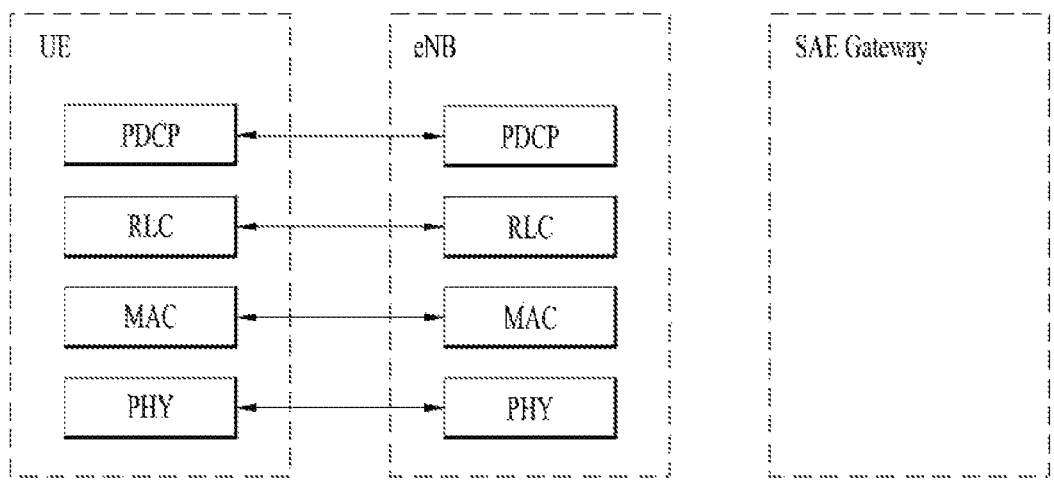

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
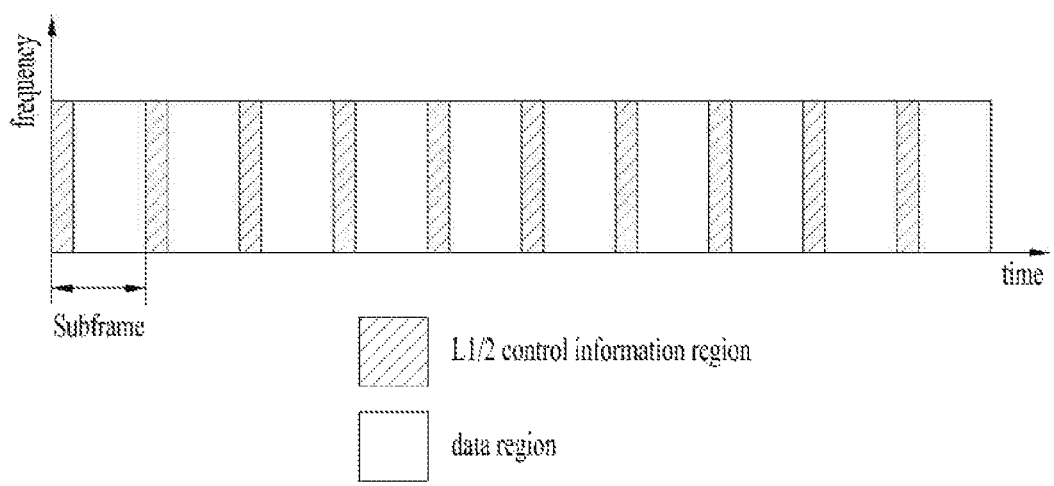
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the legacy LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 6:
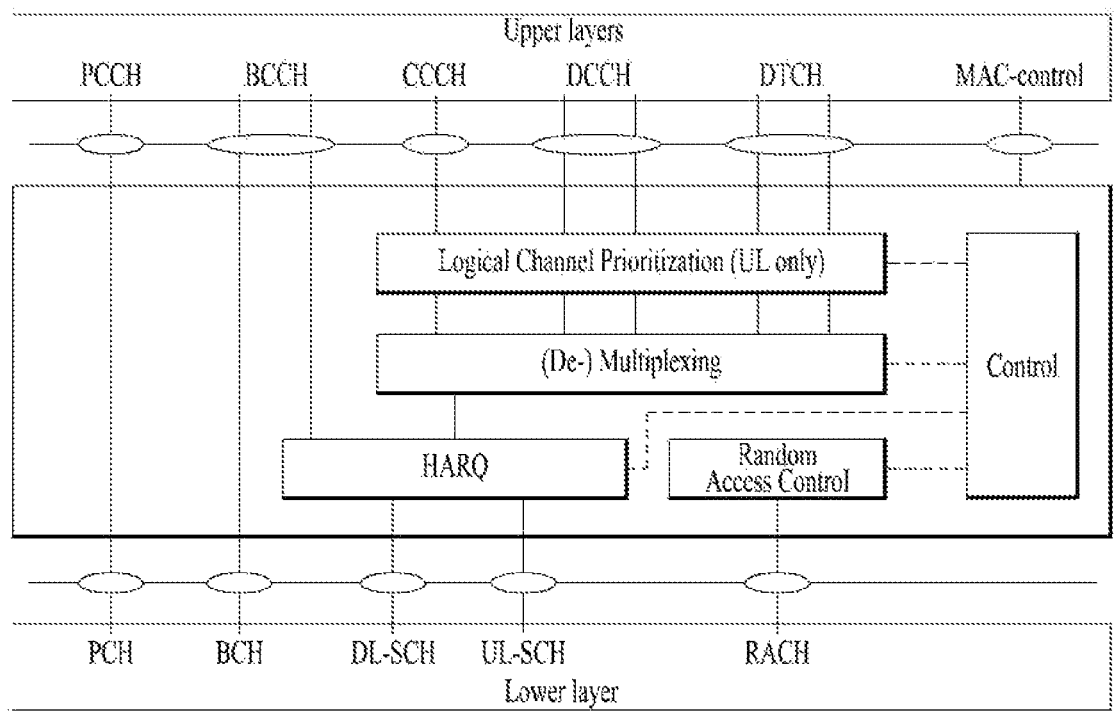
FIG. 6 is a diagram for medium access control (MAC) structure overview in a UE side.

FIG. 6 is a diagram for medium access control (MAC) structure overview in a UE side.

The MAC layer supports the following functions: mapping between logical channels and transport channels; multiplexing of MAC SDUs from one or different logical channels onto transport blocks (TB) to be delivered to the physical layer on transport channels; demultiplexing of MAC SDUs from one or different logical channels from transport blocks (TB) delivered from the physical layer on transport channels; scheduling information reporting (e.g. scheduling request, buffer status reporting); error correction through HARQ; priority handling between UEs by means of dynamic scheduling; priority handling between logical channels of one MAC entity; Logical Channel Prioritization (LCP); transport format selection; and radio resource selection for sidelink (SL).

Figure 7:
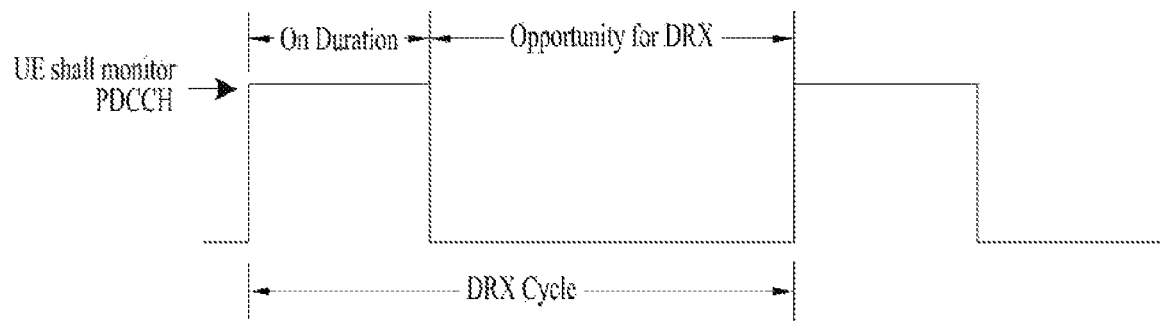
FIG. 7 is a diagram showing a concept of discontinuous reception (DRX).

FIG. 7 is a diagram showing a concept of discontinuous reception (DRX).

In the LTE/LTE-A system, DRX is performed by a UE to reduce its power consumption due to continuous monitoring of PDCCH, where monitoring implies attempting to decode each of the PDCCHs in a set of PDCCH candidates. Without DRX, the UE has to be awake all the time in order to decode downlink data, as the data in the downlink may arrive at any time. This has serious impact on the power consumption of the UE. The MAC entity may be configured by RRC with a DRX functionality that controls the UE's PDCCH monitoring activity. When in RRC_CONNECTED, if DRX is configured, the MAC entity is allowed to monitor the PDCCH discontinuously using the DRX operation; otherwise the MAC entity monitors the PDCCH continuously. Referring to FIG. 7, if DRX is configured for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle specifies the periodic repetition of the On Duration followed by a possible period of inactivity as shown in FIG. 7.

The UE always monitors a PDCCH during the On Duration in one DRX cycle and a DRX cycle determines a period in which an On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during the On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

RRC controls DRX operation by configuring the timers onDurationTimer, drx-InactivityTimer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. An eNB provides a UE with DRX configuration information including these parameters through an RRC signaling. UE receives DRX configuration information. A DL HARQ RTT timer per DL HARQ process (except for the broadcast process) and UL HARQ RTT timer per asynchronous UL HARQ process is also defined. onDurationTimer specifies the number of consecutive PDCCH-subframe(s) at the beginning of a DRX Cycle. drx-InactivityTimer specifies the number of consecutive PDCCH-subframe(s) after the subframe in which a PDCCH indicates an initial UL, DL or SL user data transmission for this MAC entity. drx-RetransmissionTimer specifies the maximum number of consecutive PDCCH-subframe(s) until a DL retransmission is received. drx-ULRetransmissionTimer specifies the maximum number of consecutive PDCCH-subframe(s) until a grant for UL retransmission is received. drxStartOffset specifies the subframe where the DRX Cycle starts. drxShortCycleTimer specifies the number of consecutive subframe(s) the MAC entity shall follow the Short DRX cycle. A DL HARQ RTT timer specifies the minimum amount of subframe(s) before a DL HARQ retransmission is expected by the MAC entity. UL HARQ RTT timer specifies the minimum amount of subframe(s) before a UL HARQ retransmission grant is expected by the MAC entity.

For each serving cell, in case of FDD configuration on the serving cell which carries the HARQ feedback for this serving cell the DL HARQ RTT timer is set to 8 subframes. For each serving cell, in case of TDD configuration on the serving cell which carries the HARQ feedback for this serving cell the DL HARQ RTT timer is set to k+4 subframes, where k is the interval between the downlink transmission and the transmission of associated HARQ feedback (see 3GPP TS 36.213). For bandwidth reduced low complexity (BL) UEs and UEs in enhanced coverage, DL HARQ RTT timer corresponds to 7+N where N is the used PUCCH repetition factor, where only valid (configured) UL subframes as configured by upper layers in fddUplinkSubframe-BitmapLC are counted. In case of TDD, HARQ RTT timer corresponds to 3+k+N, where k is the interval between the last repetition of downlink transmission and the first repetition of the transmission of associated HARQ feedback, and N is the used PUCCH repetition factor, where only valid UL subframes are counted (see 3GPP TS 36.213). For NB-IoT the HARQ RTT timer is set to k+3+N+deltaPDCCH subframes, where k is the interval between the last subframe of the downlink transmission and the first subframe of the associated HARQ feedback transmission and N is the transmission duration in subframes of the associated HARQ feedback, and deltaPDCCH is the interval from the last subframe of the associated HARQ feedback transmission plus 3 subframes to the first subframe of the next PDCCH occasion. Except for NB-IoT, UL HARQ RTT timer length is set for 4 subframes for FDD, and set to $k_{ULHARQRTT}$ subframes for TDD, where $k_{ULHARQRTT}$ equals to the $k_{PHICH}$ value indicated in a table showing $k_{PHICH}$ for TDD (see 3GPP TS 36.213). For NB-IoT, the UL HARQ RTT timer length is set to 4+deltaPDCCH subframes, where deltaPDCCH is the interval from the last subframe of the PUSCH transmission plus 4 subframes to the first subframe of the next PDCCH occasion.

The value of each of the timers is defined as the number of subframes. The number of subframes is counted until the value of a timer is reached. If the value of the timer is satisfied, the timer expires. A timer is running once it is started, until it is stopped or until it expires; otherwise it is not running A timer can be started if it is not running or restarted if it is running A timer is always started or restarted from its initial value.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

Figure 8:
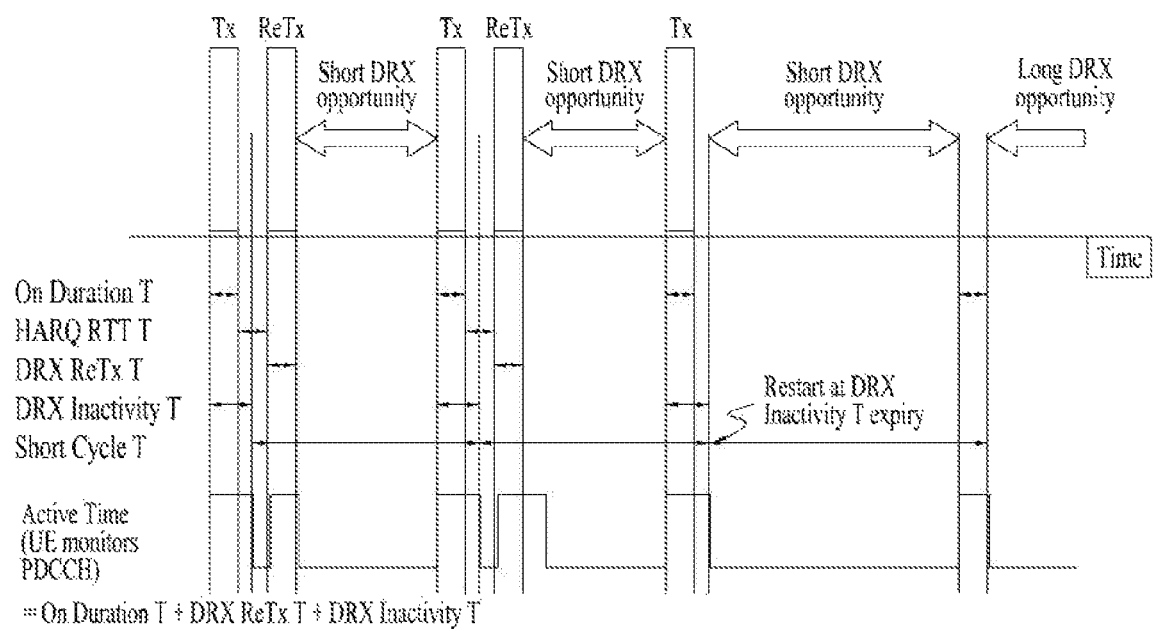
FIG. 8 is a diagram showing a method for a DRX operation in the legacy LTE/LTE-A system.

FIG. 8 is a diagram showing a method for a DRX operation in the legacy LTE/LTE-A system.

When a DRX cycle is configured, the Active Time includes the time while:

> onDurationTimer or drx-InactivityTimer or drx-RetransmissionTimer or drx-ULRetransmissionTimer or mac-ContentionResolutionTimer is running; or > a Scheduling Request is sent on PUCCH and is pending; or > an uplink grant for a pending HARQ retransmission can occur and there is data in the corresponding HARQ buffer for synchronous HARQ process; or > a PDCCH indicating a new transmission addressed to the C-RNTI of the MAC entity has not been received after successful reception of a Random Access Response for the preamble not selected by the MAC entity.

When DRX is configured, for each subframe, the MAC entity:

> if a DL HARQ RTT timer expires in this subframe and the data of the corresponding HARQ process was not successfully decoded:

>> start the drx-RetransmissionTimer for the corresponding HARQ process.

> if an UL HARQ RTT timer expires in this subframe:

>> start the drx-ULRetransmissionTimer for the corresponding HARQ process.

> if a DRX Command MAC control element or a Long DRX Command MAC control element is received:

>> stop onDurationTimer;

>> stop drx-InactivityTimer.

> if drx-InactivityTimer expires or a DRX Command MAC control element is received in this subframe:

>> if the Short DRX cycle is configured:

>>> start or restart drxShortCycleTimer;

>>> use the Short DRX Cycle.

>> else:

>>> use the Long DRX cycle.

> if drxShortCycleTimer expires in this subframe:

>> use the Long DRX cycle.

> if a Long DRX Command MAC control element is received:

>> stop drxShortCycleTimer;

>> use the Long DRX cycle.

> If the Short DRX Cycle is used and {(SFN*10)+ subframe number} modulo (shortDRX-Cycle)=(drxStart-Offset) modulo (shortDRX-Cycle); or > if the Long DRX Cycle is used and {(SFN*10)+ subframe number} modulo (longDRX-Cycle)=drxStartOffset:

>> if NB-IoT:

>>> if neither HARQ RTT Timer nor UL HARQ RTT Timer is running, start onDurationTimer.

>> else:

>>> start onDurationTimer.

> during the Active Time, for a PDCCH-subframe, if the subframe is not required for uplink transmission for half-duplex FDD UE operation, and if the subframe is not a half-duplex guard subframe (see 3GPP TS 36.211) and if the subframe is not part of a configured measurement gap and if the subframe is not part of a configured Sidelink Discovery Gap for Reception, and for NB-IoT if the subframe is not required for uplink transmission or downlink reception other than on PDCCH; or > during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId (see 3GPP TS 36.331) and if the subframe is not part of a configured measurement gap and if the subframe is not part of a configured Sidelink Discovery Gap for Reception; or > during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:

>> monitor the PDCCH;

>> if the PDCCH indicates a DL transmission or if a DL assignment has been configured for this subframe:
>>> if the UE is an NB-IoT UE, a BL UE or a UE in enhanced coverage:
>>>> start the HARQ RTT Timer for the corresponding HARQ process in the subframe containing the last repetition of the corresponding PDSCH reception;
>>> else:
>>>> start the DL HARQ RTT timer for the corresponding HARQ process;
>>> stop the drx-RetransmissionTimer for the corresponding HARQ process.
>> if the PDCCH indicates an UL transmission for an asynchronous HARQ process:
>>> start the UL HARQ RTT Timer for the corresponding HARQ process in the subframe containing the last repetition of the corresponding PUSCH transmission;
>>> except for NB-IoT, stop the drx-ULRetransmissionTimer for the corresponding HARQ process.
>> if the PDCCH indicates a new transmission (DL, UL or SL):
>>> except for NB-IoT, start or restart drx-InactivityTimer.
>> if the PDCCH indicates a transmission (DL, UL) for a NB-IoT UE:
>>> stop drx-InactivityTimer, drx-ULRetransmissionTimer and onDurationTimer.

In case of downlink spatial multiplexing, if a transport block (TB) is received while the HARQ RTT Timer is running and the previous transmission of the same TB was received at least N subframes before the current subframe (where N corresponds to the HARQ RTT Timer), the MAC entity should process it and restart the HARQ RTT Timer.

When a DRX timer is set to a value of X, and n denotes the subframe in which the related event is triggered according to the above description, the intended behaviours of each DRX timer are presented in Table 1 below:

TABLE 1

| DRX Timers | Intended UE behaviour ([x, y] means including subframe x and y) |
|---|---|
| drx-InactivityTimer | The MAC entity monitors PDCCH in PDCCH-subframes during the subframes [n + 1, n + m]. The MAC entity starts or restarts drxShortCycleTimer, and uses Short DRX Cycle in the subframe n + m + 1, if configured. |
| drx-InactivityTimerSCPTM | The MAC entity monitors PDCCH in PDCCH-subframes during the subframes [n + 1, n + m]. |
| mac-ContentionResolutionTimer or mac-ContentionResolutionTimer for the corresponding enhanced coverage level, if it exists | The MAC entity monitors PDCCH in PDCCH-subframes during the subframes [n + 1, n + X]. |
| drx-RetransmissionTimer or drx-ULRetransmissionTimer | The MAC entity monitors PDCCH in PDCCH-subframes during the subframes [n, n + m − 1]. |
| onDurationTimer or onDurationTimerSCPTM | The MAC entity monitors PDCCH in PDCCH-subframes during the subframes [n, n + m − 1]. |
| drxShortCycleTimer | The MAC entity uses the Short DRX Cycle during the subframes [n, n + X − 1]. The MAC entity starts to use the Long DRX Cycle in the subframe n + X. |
| HARQ RTT Timer | The MAC entity starts drx-RetransmissionTimer in the subframe n + X, if needed. |
| UL HARQ RTT Timer | The MAC entity starts drx-ULRetransmissionTimer in the subframe n + X, if needed. |

NOTE:
For FDD, m is equal to X; for TDD, m is equal to the minimum number of subframes so that X PDCCH-subframes are included during the subframes [x, y].
NOTE:
A MAC entity configured with eIMTA monitors PDCCH in some subframe(s) in addition to PDCCH-subframes.

In the above description, PDCCH-subframe refers to a subframe with PDCCH. For a MAC entity not configured with any TDD serving cell(s), this represents any subframe; for a MAC entity configured with at least one TDD serving cell, if a MAC entity is capable of simultaneous reception and transmission in the aggregated cells, this represents the union over all serving cells of downlink subframes and subframes including DwPTS of the TDD UL/DL configuration indicated by tdd-Config (see 3GPP TS 36.331) parameter provided through an RRC signaling, except serving cells that are configured with schedulingCellId parameter provided through an RRC signaling; otherwise, this represents the subframes where the SpCell is configured with a downlink subframe or a subframe including DwPTS of the TDD UL/DL configuration indicated by tdd-Config.

There is one HARQ entity at the MAC entity for each serving cell which maintains a number of parallel HARQ processes. Each HARQ process is associated with a HARQ process identifier. The HARQ entity directs HARQ information and associated transport blocks (TBs) received on the DL-SCH to the corresponding HARQ processes. In the legacy LTE/LTE-A system, there are a maximum of 8 DL HARQ processes per serving cell for FDD. In asynchronous HARQ operation, HARQ process is associated with TTI based on the received UL grant. Each asynchronous HARQ process is associated with a HARQ process identifier. HARQ feedback is not applicable for asynchronous UL HARQ. In the legacy LTE/LTE-A system, there are a maximum of 8 or 16 UL HARQ processes per serving cell for FDD.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) System (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

In the legacy LTE/LTE-A, transmission time interval (TTI) is used in MAC layer as a basic time unit that MAC delivers a MAC PDU to PHY, which is fixed to 1 ms. In other words, HARQ entity delivers a MAC PDU to PHY once per TTI.

Multiple numerologies, i.e., multiple subcarrier spacings, such as 30 kHz, 60 kHz, etc, are being studied for the new radio access technology. multiple time units such as slot and mini-slot are under discussion in multiple subcarrier spacing, where mini-slot is the smallest possible scheduling unit and smaller than a slot or a subframe. Although the concept of slot has already been in the legacy LTE/LTE-A, it is fixed to 0.5 ms corresponding to 7 OFDM symbols and transparent to the MAC layer operation. In NR, however, slot or mini-slot may have different lengths in time depending on the subcarrier spacing. For example, a slot length would be 0.5 ms for 30 kHz subcarrier spacing while a slot length would be 0.25 ms for 50 kHz subcarrier spacing. Furthermore, it is required for MAC layer to operate based on slot and/or mini-slot, i.e., the HARQ entity delivers a MAC PDU to PHY once per slot or mini-slot. Considering that it is up to network decision whether to schedule in unit of subframe, slot, or mini-slot, or which subcarrier spacing is to be used, the time unit used for the MAC layer operation may change dynamically. Hereinafter, a TTI length shorter than 1 ms is referred to as a shortened TTI, short TTI or sTTI, and multiple TTI lengths is referred to as multiple TTIs. Although the present invention is described with reference to 1 ms TTI and a TTI length shorter than 1 ms, the present invention can be also applied to a TTI length longer than 1 ms in the same as or similar to the following description.

A short TTI with 7 OFDM symbols and 2 OFDM symbols are introduced as a slot and a mini-slot, respectively, and a short TTI with 1 OFDM symbol is under discussion for a mini-slot. Accordingly, MAC needs to operate based on multiple TTIs.

In the LTE/LTE-A system, n+4 processing time is used, and thus it is assumed that at least 4 subframes would be required for a UL grant to UL data, or for DL data to DL HARQ. Hereinafter, n+x processing time means that processing time is corresponding x TTIs. In other words, n+4 processing time means that the related processing is triggered in a TTI n, and ends in a TTI n+4. For example, for the legacy LTE/LTE-A system with n+4 processing time, a PDCCH carrying a UL grant is received in a subframe n and UL data using the UL grant is transmitted in a subframe n+4. Considering enhanced UE/BS capability, and/or introduction of shortened TTI(s), shortened processing time is also under discussion for the NR system. For example, for shortened processing time, n+3 processing time is to be introduced and n+2 processing time is under discussion. Compared to the legacy LTE/LTE-A system, where n+4 processing time, with reduced processing time, retransmission can occur earlier than the legacy LTE/LTE-A system.

For further discussions and agreements on TTI length(s) and processing time for the NR system, RAN2 agreement in the 3GPP meeting #96, RAN1 agreement in the 3GPP meetings #86, #86b and #87, and/or 3GPP standard documents for the radio technology beyond LTE (e.g. 38 series) may be referenced.

In the present invention, proposed are methods for solving problems that occurs as a TTI length different from 1 ms TTI or multiple TTI lengths is/are used and/or for solving problems that occurs as processing time different from the legacy one is used. According to the present invention, technical effects achieved by a different or multiple TTI length(s) can be enhanced, and technical effects achieved by the shortened processing time can be enhanced.

<A. DRX Timer>

A UE does not monitor a PDCCH while a DL/UL RTT timer is running The DL/UL HARQ RTT timer defines how long the UE can sleep before it wakes up for the next DL/UL retransmission which depends on both the TTI length and eNB processing time. The HARQ RTT timer (i.e. DL HARQ RTT timer) and the UL HARQ RTT timer in the LTE/LTE-A system has been defined considering only one TTI length and only one processing time. Operations of a DL/UL HARQ RTT timer for the NR system should be newly defined if shortended/lengthed TTI or multiple TTIs is/are configured, and/or if reduced processing time is introduced. In this section, the present invention proposes an adaptive (DL/UL) HARQ RTT timer for multiple TTIs.

DRX timers currently used in the LTE/LTE-A system are defined either in number of subframes (mac-ContentionResolutionTimer, DRX Cycle, drxShortCycleTimer, HARQ RTT Timer, UL HARQ RTT Timer) or in number of PDCCH-subframes of 1 ms length (onDurationTimer, drx-InactivityTimer, drx-RetransmissionTimer, drx-ULRetransmissionTimer). The following DRX timers used in the LTE/LTE-A system are defined in the document 3GPP TS 36.321.

* Active Time: Time related to DRX operation, during which the MAC entity monitors the PDCCH. Active Time refers to other timers i.e. is the result of other timer(s) running.

* mac-ContentionResolutionTimer: Specifies the number of consecutive subframe(s) during which the MAC entity shall monitor the PDCCH after Msg3 is transmitted. mac-ContentionResolutionTimer refers to subframes.

* DRX Cycle: Specifies the periodic repetition of the On Duration followed by a possible period of inactivity. DRX Cycle refers to subframes.

* drx-Inactivity Timer: Specifies the number of consecutive PDCCH-subframe(s) after the subframe in which a PDCCH indicates an initial UL, DL or SL user data transmission for this MAC entity. drx-Inactivity Timer refers to PDCCH subframes

* drx-RetransmissionTimer: Specifies the maximum number of consecutive PDCCH-subframe(s) until a DL retransmission is received. drx-RetransmissionTimer refers to PDCCH subframes
* drx-ULRetransmissionTimer: Specifies the maximum number of consecutive PDCCH-subframe(s) until a grant for UL retransmission is received. drx-ULRetransmissionTimer refers to PDCCH subframes.
* drxShortCycleTimer: Specifies the number of consecutive subframe(s) the MAC entity shall follow the Short DRX cycle. drxShortCycleTimer refers to subframes.
* drxStartOffset: Specifies the subframe where the DRX Cycle starts. drxStartOffset refers to subframes.
* HARQ RTT Timer: This parameter specifies the minimum amount of subframe(s) before a DL HARQ retransmission is expected by the MAC entity. HARQ RTT Timer refers to subframes.
* UL HARQ RTT Timer: This parameter specifies the minimum amount of subframe(s) before a UL HARQ retransmission grant is expected by the MAC entity. UL HARQ RTT Timer refers to subframes.
* onDurationTimer: Specifies the number of consecutive PDCCH-subframe(s) at the beginning of a DRX Cycle. onDurationTimer refers to PDCCH subframes.

With introduction of shortened TTI, it should be discussed if the DRX timers need to be scaled to the sTTI length or could be kept unchanged with the unit of 1 ms length. During a 3GPP meeting for the NR system, HARQ RTT timer has been discussed and decided that the unit for HARQ RTT timer counting is the TTI length of the TB that starts the timer. However, at that 3GPP meeting, only the shortened TTI length was considered while the processing time aspect was not considered. In this case, the UE cannot benefit from shortened processing time because the UE will start monitoring for retransmission only based on the legacy processing time, i.e., n+4, while the counting is based on the TTI length that starts the timer. For example, if normal TTI length of 1 m is used with shortened processing time n+3, then the UE will count 4 ms of HARQ RTT Timer and start monitoring for retransmission 4 ms after the initial transmission.

In order to benefit from shortened processing time, it seems logical that the UE applies a shortened processing time for a HARQ RTT timer. However, even with shortened processing time, the UE may fall back to normal processing time for some cases. For example, for system information, paging, and random access response (RAR), the UE monitors a common search space (CSS). In this case, the UE should not apply a shortened processing time for HARQ RTT timer even if the UE supports shortened processing time. Otherwise, the UE could start monitoring PDCCH unnecessarily earlier than needed. It is because an eNB should transmit PDCCHs with a normal processing time in the CSS, since the CSS is common to UEs camped on a cell, and it is unclear whether the UEs monitoring the CSS support the reduced processing time. In this case, if a UE starts monitoring a PDCCH in the CSS based on a shortened processing time while an eNB transmits PDCCHs in the CSS based on a normal processing time, the UE might start monitoring PDCCH way before the eNB transmits PDCCH. This results in the waste of the UE battery.

Therefore, a UE supporting a shortened processing time needs a mechanism to apply a different HARQ RTT timer values depending on which processing time is applied to the data transmission that starts the HARQ RTT timer.

In the present invention, when a UE supporting shortened processing time is scheduled a data transmission, the UE uses a certain value for a corresponding HARQ RTT timer depending on a processing time that is required for the data transmission. In the present invention, a HARQ RTT timer refers to either a HARQ RTT timer in downlink or a HARQ RTT timer in uplink.

In detail, if the UE is scheduled a data transmission that requires a processing time of K, the UE uses a HARQ RTT timer which is set to value X. The association between K and X can be specified in the specification (e.g. 3GPP standards documents) or pre-defined. For example, in case of FDD configuration, for downlink, if K=3, X can be set to 6, and if K=2, X can be set to 4. For example, in case of FDD configuration, for uplink, if K=3, X can be set to 3. K and X can be a unit of TTI, which may be 1 ms, or a certain value less than 1 ms if a shortened TTI is used.

In the present invention, the value X for a HARQ RTT timer may be different depending on RNTIs, or depending on search spaces. In other words, a HARQ RTT timer may be defined/configured per RNTI, or per search space type. A UE may apply different values for a HARQ RTT according to RNTIs. A UE may apply different values for a HARQ RTT timer according to search space types.

A UE is configured to use a short processing time by a network. The UE may report processing time(s) supported by the UE to the network, and the network may configure the UE to use a short processing time by transmitting configuration information on the short processing time if the UE supports the short processing time. The processing time for the UE may be configured per HARQ process.

The UE monitors a PDCCH, where PDCCH refers to e.g., PDCCH, EPDCCH, MPDCCH, NPDCCH or short PDCCH (sPDCCH). The UE receives a PDCCH scheduling a data transmission.

If the UE receives the PDCCH addressed by SI-RNTI, P-RNTI, or RA-RNTI, or if the UE receives the PDCCH on a common search space (CSS), the UE may consider that the data transmission requires a normal process time (e.g., normal processing time of 4 TTIs), and start a corresponding HARQ RTT timer, where the value of the corresponding HARQ RTT timer is set to a value (e.g., 8 TTIs) associated with the normal processing time. Else, if the UE receives the PDCCH addressed by C-RNTI or any RNTI other than SI-RNTI, P-RNTI, or RA-RNTI, or if the UE receives the PDCCH on a UE-specific search space (USS), or if the UE receives the PDCCH on a UE-specific search space (USS) and the PDCCH indicates the shortened processing time, the UE may considers that the data transmission requires a shortened process time (e.g., shortened processing time of 3 TTIs or 2 TTIs), and start a corresponding HARQ RTT timer, where the value of the corresponding HARQ RTT timer is set to a value (e.g., 6 TTIs or 4 TTIs) associated with the shortened processing time.

In an example of the present invention, if the UE receives the PDCCH addressed by SI-RNTI, P-RNTI, or RA-RNTI, the UE may consider that the data transmission requires a normal process time (e.g., normal processing time of 4 TTIs), and start a corresponding HARQ RTT timer, where the value of the corresponding HARQ RTT timer is set to a value (e.g., 8 TTIs) associated with the normal processing time. Else, if the UE receives the PDCCH addressed by C-RNTI or any RNTI other than SI-RNTI, P-RNTI, or RA-RNTI, the UE may considers that the data transmission requires a shortened process time (e.g., shortened processing time of 3 TTIs or 2 TTIs), and start a corresponding HARQ RTT timer, where the value of the corresponding HARQ RTT timer is set to a value (e.g., 6 TTIs or 4 TTIs) associated with the shortened processing time. It is also possible that SI-RNTI, P-RNTI, RA-RNTI and C-RNTI may have different HARQ RTT timer values from each other.

In another example of the present invention, if the UE receives the PDCCH on a common search space (CSS), the UE may considers that the data transmission requires a normal process time (e.g., normal processing time of 4 TTIs), and start a corresponding HARQ RTT timer, where the value of the corresponding HARQ RTT timer is set to a value (e.g., 8 TTIs) associated with the normal processing time. Else, if the UE receives the PDCCH on a UE-specific search space (USS) or if the UE receives the PDCCH on a UE-specific search space (USS) and the PDCCH indicates the shortened processing time, the UE may consider that the data transmission requires a shortened process time (e.g., shortened processing time of 3 TTIs or 2 TTIs), and start a corresponding HARQ RTT timer, where the value of the corresponding HARQ RTT timer is set to a value (e.g. 6 TTIs or 4 TTIs) associated with the shortened processing time.

The length of a TTI is determined by the TB that starts the timer. For example, if a timer is started by a TB scheduled in normal TTI, the length of the TTI is 1 ms. For another example, if a timer is started by a TB scheduled in shortened TTI, the length of the TTI can be 0.5 m, or 0.25 ms. In other words, the unit for HARQ RTT timer counting is the TTI length of the TB that starts the timer.

When the HARQ RTT timer expires, the UE starts a drx-RetransmissionTimer, where the drx-RetransmissionTimer refers to either a drx-RetransmissionTimer in downlink or uplink.

Figure 9:
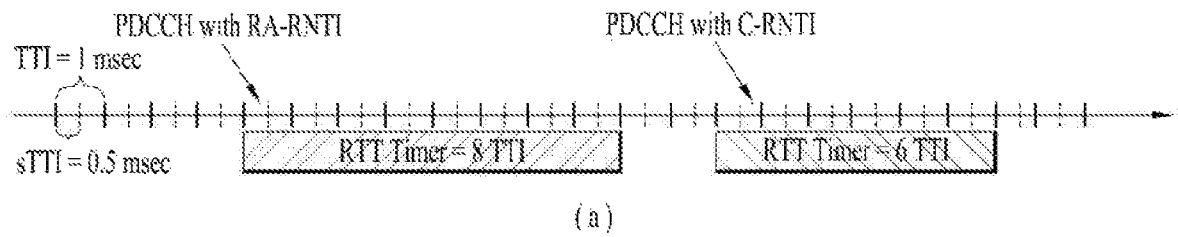
FIG. 9 illustrates examples of a HARQ RTT timer according to the present invention.
Figure 9:
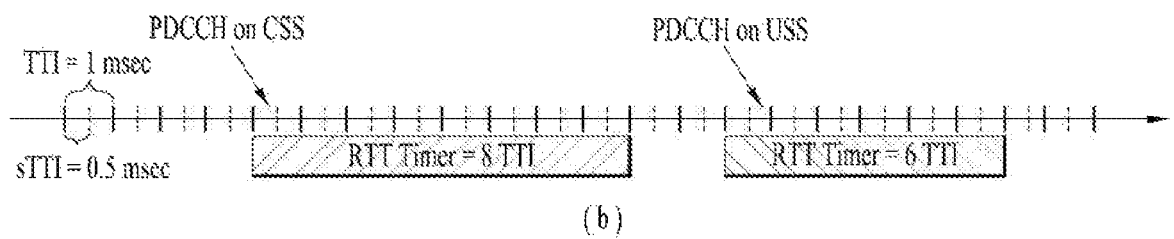

FIG. 9 illustrates examples of a HARQ RTT timer according to the present invention. Especially, FIG. 9 illustrates HARQ RTT timers for frequency division duplex (FDD), where a HARQ RTT timer for normal processing time is assumed to be 8 TTIs and a HARQ RTT timer for shortened processing time (e.g., 3 TTIs) is assumed to 6 TTIs.

Referring to FIG. 9(a), in an example of the present invention, the UE monitors a PDCCH. If the UE receives a PDCCH addressed by RA-RNTI, the UE receives an RAR as indicated by the PDCCH, and starts a corresponding HARQ RTT timer which is set to 8 TTIs. If the HARQ RTT timer expires, the UE starts drx-RetransmissionTimer depending on the result of decoding of the received data, i.e., RAR. For example, if decoding the received data fails, the UE starts drx-RetransmissionTimer when the HARQ RTT timer expires, and if decoding the received data is successful, the UE does not start drx-RetransmissionTimer.

The UE monitors a PDCCH while the drx-RetransmissionTimer is running If the UE receives a PDCCH addressed by C-RNTI, the UE receives a data as indicated by the PDCCH, and starts a corresponding HARQ RTT timer which is set to 6 TTIs. If the HARQ RTT timer expires, the UE starts drx-RetransmissionTimer depending on the result of decoding of the received data.

Referring to FIG. 9(b), in another example of the present invention, the UE monitors PDCCH. If the UE receives a PDCCH on CSS, the UE receives an RAR as indicated by the PDCCH, and starts a corresponding HARQ RTT timer which is set to 8 TTIs. If the HARQ RTT timer expires, the UE starts drx-RetransmissionTimer depending on the result of decoding of the received data. For example, if decoding the received data fails, the UE starts drx-RetransmissionTimer when the HARQ RTT timer expires, and if decoding the received data is successful, the UE does not start drx-RetransmissionTimer.

The UE monitors PDCCH while the drx-RetransmissionTimer is running If the UE receives a PDCCH on USS, the UE receives a data as indicated by the PDCCH, and starts a corresponding HARQ RTT timer which is set to 6 TTIs. If the HARQ RTT timer expires, the UE starts drx-RetransmissionTimer depending on the result of decoding of the received data. For example, if decoding the received data fails, the UE starts drx-RetransmissionTimer when the HARQ RTT timer expires, and if decoding the received data is successful, the UE does not start drx-RetransmissionTimer.

According to the present invention, a UE can avoid starting PDCCH monitoring earlier than needed and can start monitoring PDCCHs at the proper time, whereby the UE battery can be saved.

<B. Logical Channel Prioritization Operation>

Dynamic change of time unit in MAC layer operation would have an impact in Logical Channel Prioritization (LCP) operation. In the legacy LTE/LTE-A system, token-bucket model is used for LCP operation in order to meet the prioritized bit rate (PBR) requirement in a long term average manner, i.e., not per TTI.

Figure 10:
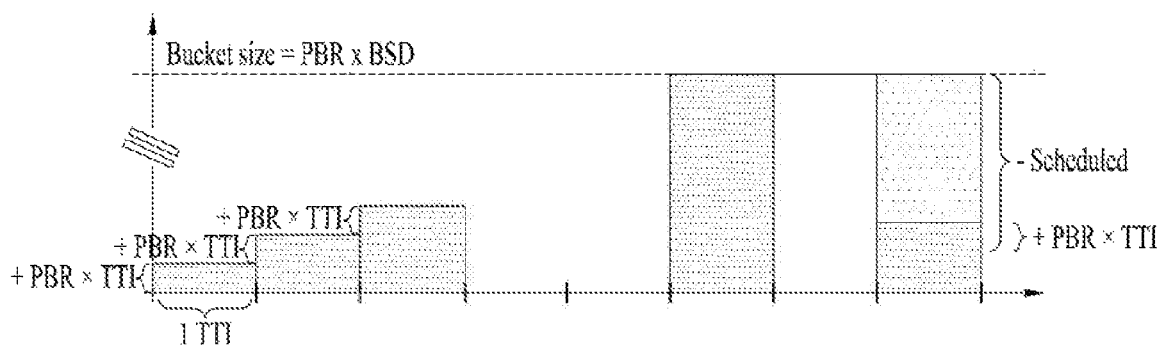
FIG. 10 illustrates the token-bucket model of the logical channel prioritization (LCP) procedure in the LTE/LTE system.

FIG. 10 illustrates the token-bucket model of the logical channel prioritization (LCP) procedure in the LTE/LTE system.

In the token-bucket model, bucket for a logical channel (Bj) is increased every TTI by PBR×TTI duration. The bucket for the logical channel cannot exceed its maximum bucket size, i.e., PBR×Bucket Size Duration (BSD). Every time when a MAC SDU of the logical channel is included in a MAC PDU, the bucket is decreased by the amount of scheduled MAC SDUs. If token is less than 0, i.e., negative, that logical channel cannot be scheduled. Currently, Bj is increased for all logical channel in every TTI. In the token-bucket model, the network can control scheduling of uplink data by PBR and BSD. The higher the PBR is, the faster the bucket size is reached. It means that a logical channel with higher PBR value will take more opportunity in transmission. On the other hand, BSD indicates how much time is to be taken until the bucket size is reached for transmitting uplink data of a logical channel by using the PBR.

In order to support multiple numerologies, it was suggested that each logical channel is configured with a specific numerology while there is one reference numerology for a UE. Then, from MAC point of view, there will be at least two TTIs for one logical channel, i.e., one is associated numerology and the other one is reference numerology. In this case, if the token-bucket model is performed based on the reference numerology, there are some problems as follows.

Figure 11:
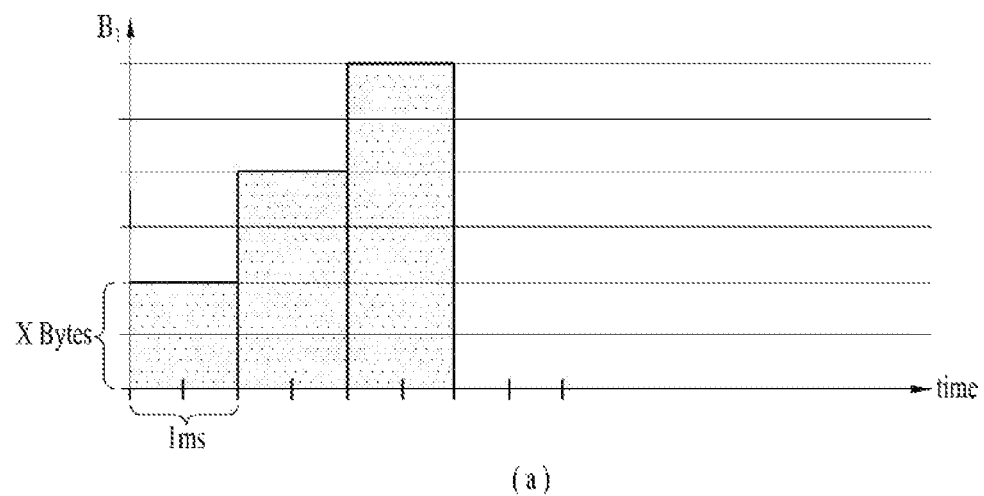
FIG. 11 illustrates an example of bucket size changes according to token-bucket model based on a reference TTI duration, where the reference TTI duration is larger than its own TTI duration.
Figure 11:
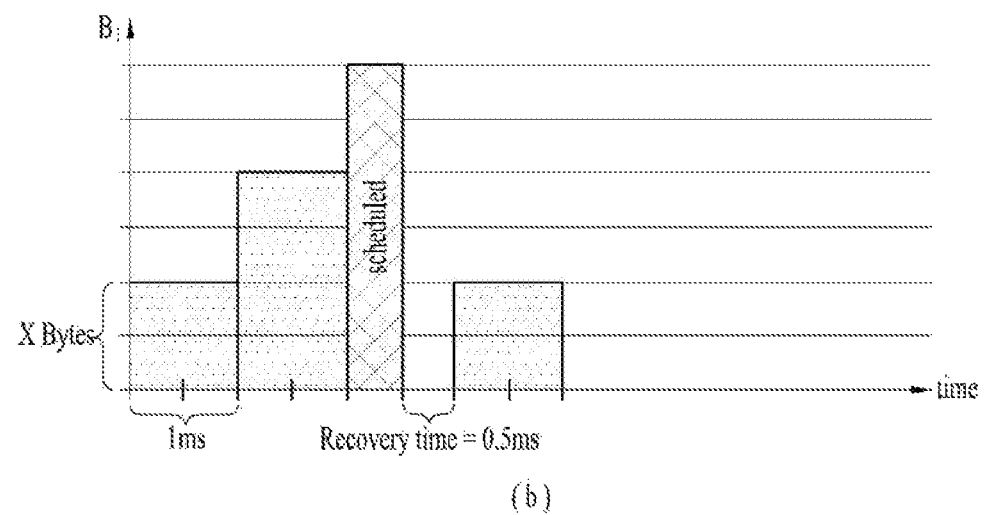

FIG. 11 illustrates an example of bucket size changes according to token-bucket model based on a reference TTI duration, where the reference TTI duration is larger than its own TTI duration.

Referring to FIG. 11(a), as a reference numerology, a reference TTI duration is set to 1 ms. A logical channel 1 is configured with numerology that TTI=0.5 ms. The logical channel 1 is configured with PBR=X kBps. If the token-bucket is based on the reference numerology, $B_1$ for logical channel 1 is increased by PBR×TTI duration=X kBps x 1 ms=X Bytes in every 1 ms. Increasing $B_1$ in every reference numerology, i.e., 1 ms, means that it would take some time to recover its $B_1$ once scheduled based on the TTI associated with the logical channel, i.e., 0.5 ms. FIG. 11(b) shows an example that it takes 0.5 ms recovery time to increase $B_1$ after being scheduled based on its TTI, i.e., 0.5 ms. During the recovery time, the logical channel 1 cannot be scheduled since $B_1$ is 0. Accordingly, given that the motivation for shortened TTI is to enable short interval scheduling, it wouldn't be desirable to increase the $B_1$ based on a TTI duration which is larger than the intended scheduling interval.

Figure 12:
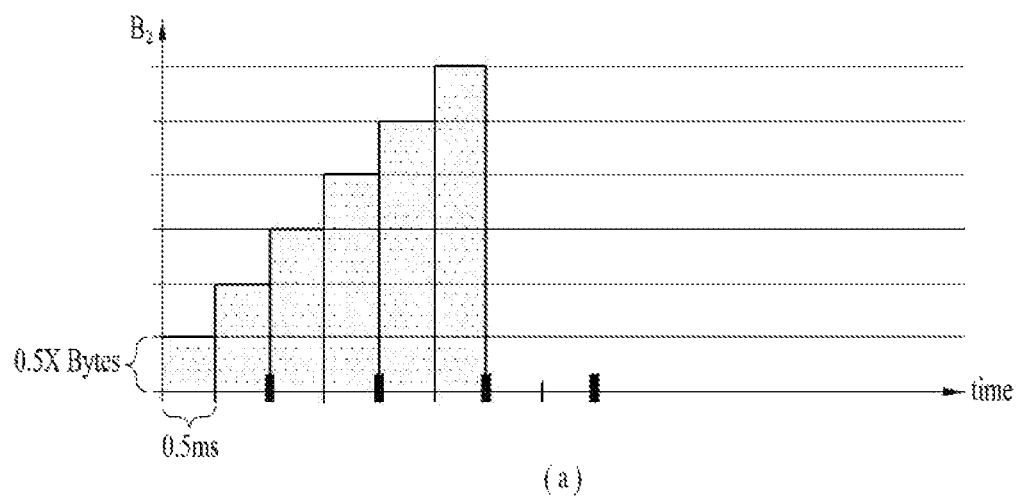
FIG. 12 illustrates an example of bucket size changes according to token-bucket model based on a reference TTI duration, where the reference TTI duration is smaller than its own TTI duration.
Figure 12:
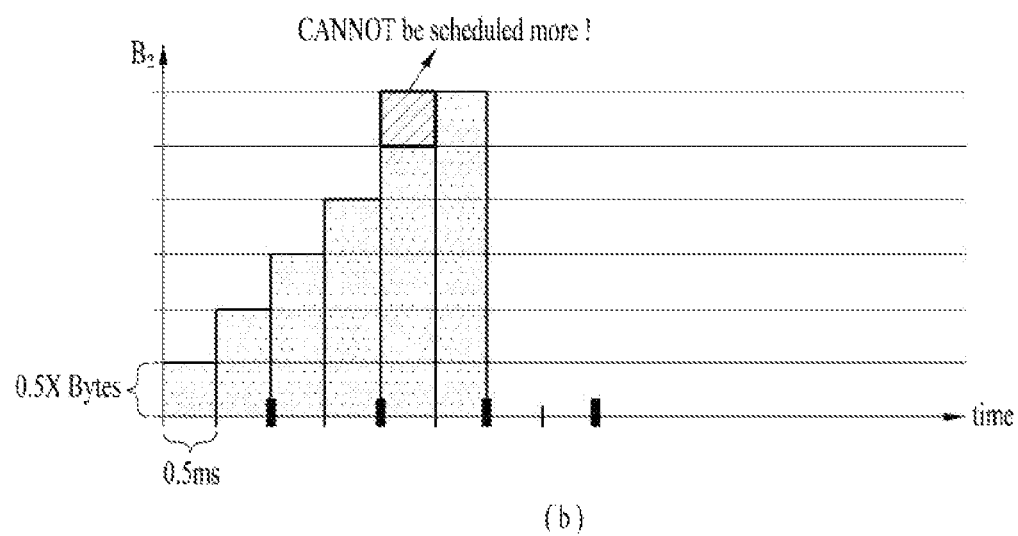

FIG. 12 illustrates an example of bucket size changes according to token-bucket model based on a reference TTI duration, where the reference TTI duration is smaller than its own TTI duration.

Referring to FIG. 12(a), as a reference numerology, reference TTI duration is set to 0.5 ms. A logical channel 2 is configured with numerology that TTI=1 ms. The logical channel 2 is configured with PBR=X kBps. If token-bucket is based on the reference numerology, $B_2$ for logical channel 2 is increased by PBR×TTI duration=X kBps x 0.5 ms=0.5X Bytes in every 0.5 ms. Increasing $B_2$ in every reference numerology, i.e., 0.5 ms, means that it would take some time to reach its intended $B_2$ within its own TTI duration. FIG. 12(b) shows gradual increase of $B_2$ within 1 ms TTI duration, which is the associated TTI duration of logical channel 2. Within 1 ms TTI duration, $B_2$ will increase gradually in every 0.5 ms, and hence, reaches its intended $B_2$ (highlighted with diagonal stripe pattern) at the end point within 1 ms TTI duration. It means that the resource that can be allocated to logical channel 2 is limited by the $B_2$ in the beginning point within 1 ms, which is less than the intended $B_2$.

As shown in FIG. 11 and FIG. 12, using a reference numerology in LCP operation is not desirable if multiple numerologies are configured for a logical channel Accordingly, the present invention proposes a new LCP procedure with multiple TTI durations.

For a UE configured with a reference TTI duration, if the UE is configured with a logical channel associated with another TTI duration, the UE uses the TTI duration associated with the logical channel in the LCP operation. In detail, the UE increases a bucket of the logical channel in every TTI duration associated with the logical channel In addition, the UE can decrease a bucket of the logical channel at a time point within the TTI duration associated with the logical channel Hereinafter, R_TTI refers to a reference TTI duration, and LC_TTI refers to a TTI duration associated with a logical channel A UE is configured with R_TTI by a network. In order to configure a logical channel to the UE, the network transmits to the UE a logical channel configuration information. In other words, the UE receives the logical channel configuration information from the network. The logical channel configuration information may include a logical channel identity, j; a LC_TTI associated with the logical channel; and PBR and BSD associated with the logical channel. The R_TTI and the LC_TTI may not be the same. R_TTI may be less or larger than LC_TTI.

In the LCP procedure, the UE maintains a value Bj for the logical channel j. The UE sets Bj to zero when the logical channel j is established. The UE increases the Bj of the logical channel j as follows.

The UE increases the value Bj in every LC_TTI duration if the logical channel j is associated with LC_TTI. The UE increases the Bj by the product PBR*LC_TTI.

The UE increases the value Bj in every R_TTI duration if the logical channel j is not associated with any LC_TTI, i.e., there is no LC_TTI signaled to the UE regarding the logical channel j, or if the logical channel j is associated with R_TTI. The UE increases the value Bj by the product PBR*R_TTI.

The value Bj cannot exceed the bucket size, which is the product PBR*BSD.

The UE can be configured with multiple logical channels, where each logical channel is associated with its own LC_TTI. LC_TTI for one logical channel can be different from LC_TTI for another logical channel If the UE is configured with multiple logical channels, where each logical channel is associated with its own LC_TTI, the UE performs Bj increment of a logical channel j based on each LC_TTI associated with the logical channel j.

Figure 13:
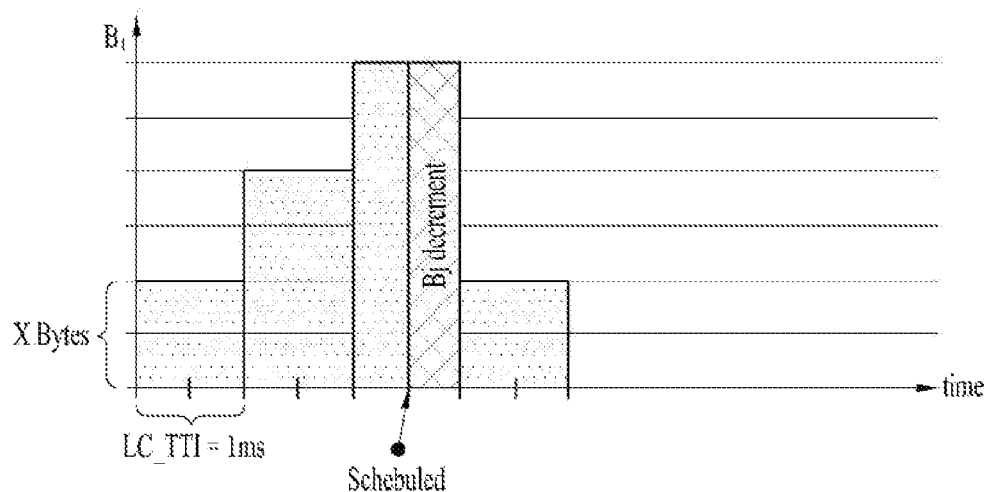
FIG. 13 illustrates an example that shows Bj decrement within a LC_TTI duration.

FIG. 13 illustrates an example that shows Bj decrement within a LC_TTI duration.

The UE may decrease the value Bj by the total size of MAC SDUs served to the logical channel j at any point in time within the LC_TTI or R_TTI if a scheduling resource is allocated to the Bj. For example, if LC_TTI is signaled for the logical channel j, when a scheduling resource is allocated to the logical channel j at a point in time within the current LC_TTI duration, the UE decreases the value Bj within LC_TTI duration. After decreasing the value Bj, the UE maintains the value Bj at the end of the current LC_TTI duration and increases the value Bj by product PBR*LC_TTI at the next LC_TTI duration.

Figure 14:
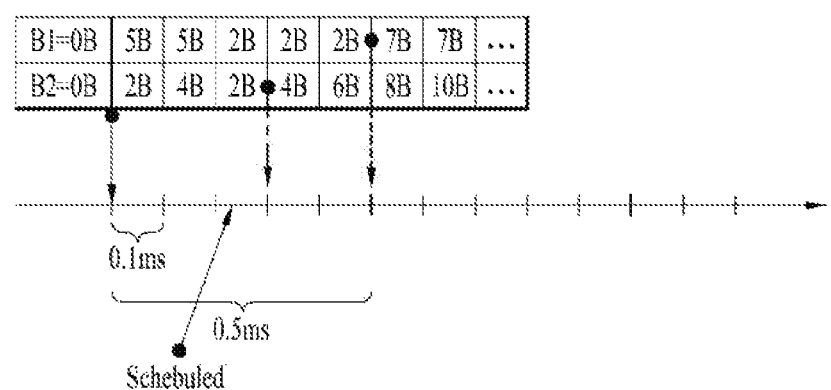
FIG. 14 illustrates an example of the logical channel prioritization (LCP) procedure according to the present invention.

FIG. 14 illustrates an example of the LCP procedure according to the present invention.

Referring to FIG. 14, a UE is configured with a logical channel 1 (LC1), where LC_TTI=0.5 ms and PBR is 10 Kbytes. The UE is configured with a logical channel 2 (LC2), where LC_TTI=0.1 ms and PBR is 20 Kbytes. After configuring the LC1, the UE increases B1 at every 0.5 ms by 5 bytes. After configuring the LC2, the UE increases B2 at every 1 ms by 2 bytes. The UE is scheduled. The scheduled resource is allocated 3 bytes to the LC1 and 4 bytes to the LC2. Then, the UE decreases B1 by 3 bytes and decreases B2 by 4 bytes. For the LC2, the UE increases B1 by 2 bytes at the next 0.1 ms of TTI duration (see the broken line arrow). For the LC1, the UE maintains B2 until the end of the current 0.5 ms of TTI duration, and increases B2 by 5 bytes at the next 0.5 ms of TTI duration (see the dotted line arrow).

The present invention described in the section B may be used together with the present invention described in the section A. For example, a UE may receive a PDCCH carrying a UL grant according to the section A, and then the UE may perform the LCP procedure for the UL grant according to the section B.

Figure 15:
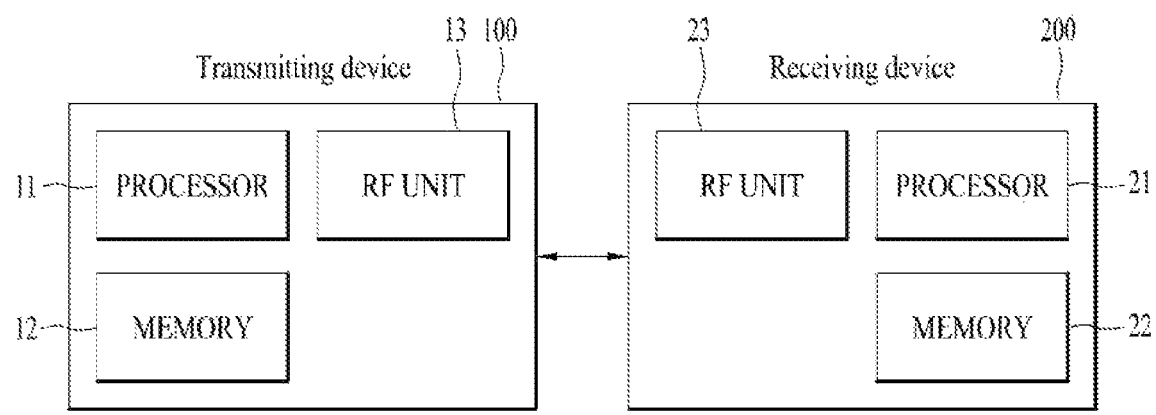
FIG. 15 is a block diagram illustrating elements of a transmitting device 100 and a receiving device 200 for implementing the present invention.

FIG. 15 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

A UE processor control the RF unit to receive a physical downlink control channel (PDCCH) scheduling a data transmission, and start a hybrid automatic repeat request (HARQ) round trip timer (RTT) timer for the data transmission. The UE processor may set the HARQ RTT timer to a non-negative value associated with a radio network temporary identifier (RNTI) addressing the PDCCH. In other words, different values can be used for a HARQ RTT timer, depending on which RNTI addresses the PDCCH detected by the UE. A value for a HARQ RTT timer may be configured or pre-defined per RNTI. The UE processor may start a retransmission timer when the HARQ RTT timer expires, and monitor a PDCCH for retransmission of the data transmission while the retransmission timer is running The non-negative value may be a first value if the RNTI is system information RNTI (SI-RNTI), paging RNTI (P-RNTI) or random access RNTI (RA-RNTI), and the non-negative value is a second value if the RNTI is other than the SI-RNTI, the P-RNTI or the RA-RNTI, where the RNTI other than the SI-RNTI, the P-RNTI or the RA-RNTI may be cell RNTI (C-RNTI). The first value may be larger than the second value, the first value may be associated with a normal processing time, and the second value may be associated with a short processing time.

The non-negative value may be a first value if receiving the PDCCH in a common search space, and the non-negative value may be a second value if receiving the PDCCH in UE-specific search space. The first value may be larger than the second value. The first value may be associated with a normal processing time, and the second value may be associated with a short processing time.

An eNB processor may configure a UE with multiple logical channels. The eNB processor may control the eNB RF unit to transmit configuration information of the multiple logical channels to the UE. A UE processor of the UE may control a UE RF unit to receive the configuration information. If the UE is configured with the multiple logical channels, where each logical channel is associated with its own LC_TTI, the UE processor may perform Bj increment of a logical channel j based on each LC_TTI associated with the logical channel j. The UE processor may decrease the value Bj by the total size of MAC SDUs served to the logical channel j at any point in time within the LC_TTI or R_TTI if a scheduling resource is allocated to the Bj. For example, if LC_TTI is signaled for the logical channel j, when a scheduling resource is allocated to the logical channel j at a point in time within the current LC_TTI duration, the UE processor may decrease the value Bj within LC_TTI duration. After decreasing the value Bj, the UE processor may maintain the value Bj at the end of the current LC_TTI duration and increase the value Bj by product PBR*LC_TTI at the next LC_TTI duration.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for receiving, by a user equipment (UE), downlink signals in a wireless communication system, the method comprising:
   receiving, by the UE, a physical downlink control channel (PDCCH) scheduling a transmission of a transport block (TB); and
   starting a hybrid automatic repeat request (HARQ) round trip timer (RTT) for the data transmission,
   wherein the HARQ RTT timer is set to a non-negative value associated with a radio network temporary identifier (RNTI) addressing the PDCCH,
   wherein the non-negative value is a first value if the RNTI is a system information RNTI (SI-RNTI), paging RNTI (P-RNTI) or random access RNTI (RA-RNTI), and the non-negative value is a second value if the RNTI is a cell RNTI (C-RNTI),
   wherein the first value is larger than the second value,
   wherein the first value is associated with a normal processing time, and the second value is associated with a short processing time,
   wherein the normal processing time and the short processing time are defined by a number of transmission time intervals (TTIs), and
   wherein a length of the TTI is determined dynamically based on the TB.

2. The method according to claim 1, further comprising:
   starting, by the UE, a retransmission timer when the HARQ RTT expires; and
   monitoring, by the UE, a PDCCH for retransmission of the data transmission while the retransmission timer is running.

3. A user equipment (UE) for receiving downlink signals in a wireless communication system, the UE comprising:
   a transmitter and a receiver, and
   a processor operatively coupled to the transmitter and receiver, the processor configured to:
   control the receiver to receive a physical downlink control channel (PDCCH) scheduling a transmission of a transport block (TB); and
   start a hybrid automatic repeat request (HARQ) round trip timer or (RTT) the data transmission,
   wherein the HARQ RTT is set to a non-negative value associated with a radio network temporary identifier (RNTI) addressing the PDCCH,
   wherein the non-negative value is a first value if the RNTI is a system information RNTI (SI-RNTI), paging RNTI (P-RNTI) or random access RNTI (RA-RNTI), and the non-negative value is a second value if the RNTI is other than the SI-RNTI, the P-RNTI or the RA-RNTI,
   wherein the first value is larger than the second value,
   wherein the first value is associated with a normal processing time, and the second value is associated with a short processing time,
   wherein the normal processing time and the short processing time are defined by a number of transmission time intervals (TTIs), and
   wherein a length of the TTI is determined dynamically based on the TB.

4. The UE according to claim 3, wherein the processor is further configured to:
   start a retransmission timer when the HARQ RTT expires; and
   monitor a PDCCH for retransmission of the data transmission while the retransmission timer is running.

* * * * *